US009463797B2

(12) United States Patent
Damerow et al.

(10) Patent No.: US 9,463,797 B2
(45) Date of Patent: Oct. 11, 2016

(54) METHOD AND VEHICLE WITH AN ADVANCED DRIVER ASSISTANCE SYSTEM FOR RISK-BASED TRAFFIC SCENE ANALYSIS

(71) Applicant: HONDA RESEARCH INSTITUTE EUROPE GMBH, Offenbach/Main (DE)

(72) Inventors: Florian Damerow, Uelversheim (DE); Julian Eggert, Offenbach (DE)

(73) Assignee: HONDA RESEARCH INSTITUTE EUROPE GMBH, Offenbach/Main (DE)

(*) Notice: Subject to any disclaimer, the term of this patent is extended or adjusted under 35 U.S.C. 154(b) by 0 days.

(21) Appl. No.: 14/692,008

(22) Filed: Apr. 21, 2015

(65) Prior Publication Data

US 2015/0344030 A1 Dec. 3, 2015

(30) Foreign Application Priority Data

May 30, 2014 (EP) ..................................... 14170636
Jun. 20, 2014 (EP) ..................................... 14173271

(51) Int. Cl.
*B60W 30/095* (2012.01)
*G06K 9/00* (2006.01)
*G08G 1/16* (2006.01)

(52) U.S. Cl.
CPC ...... *B60W 30/0956* (2013.01); *G06K 9/00798* (2013.01); *G08G 1/165* (2013.01); *G08G 1/166* (2013.01); *G06K 9/00805* (2013.01)

(58) Field of Classification Search
CPC . B60T 7/22; G06K 9/00805; B60R 21/0134; G08G 5/045; G08G 1/16; G08G 5/0008; G08G 5/04; G06F 17/10; G06F 17/00; G06F 7/00; G06F 19/00; G05D 1/00; G05D 3/00; G05D 1/104; G06N 5/048; G06N 5/04; B60W 30/10; B60W 30/0956
See application file for complete search history.

(56) References Cited

U.S. PATENT DOCUMENTS 8,762,044 B2 * 6/2014 Kelly ........................ G06F 7/00
434/305
2008/0097699 A1 * 4/2008 Ono .................... B60R 21/0134
701/300

(Continued)

FOREIGN PATENT DOCUMENTS

DE 10 2011 106 176 A1 2/2012
DE 10 2012 005 272 A1 10/2012

(Continued)

OTHER PUBLICATIONS

European Search Report dated Oct. 21, 2014 corresponding to European Patent Application No. 14173271.9.

(Continued)

*Primary Examiner* — Behrang Badii
(74) *Attorney, Agent, or Firm* — Squire Patton Boggs (US) LLP

(57) ABSTRACT

A method supports driving an ego-vehicle including a driver assistance system. A traffic participant or infrastructure element involved in the traffic situation is selected and taken into consideration for traffic scene analysis. A hypothetical future trajectory for the ego-vehicle is predicted by predicting the current state of the ego-vehicle and varied to generate a plurality of ego-trajectory alternatives including the calculated hypothetical future ego-trajectory. A hypothetical future trajectory from another traffic participant gained by predicting the current state of the traffic participant or calculating a hypothetical future state sequence of the infrastructure element is determined. Based upon at least one pair of ego-trajectory plus one other trajectory risk functions over time or along the calculated hypothetical future ego-trajectory alternatives are calculated. One risk function corresponds to one ego-trajectory alternative. The risk functions are combined into a risk map. From an analysis result a control signal is generated.

16 Claims, 7 Drawing Sheets

(56) References Cited

U.S. PATENT DOCUMENTS

| | | | | |
|---|---|---|---|---|
| 2010/0174425 | A1* | 7/2010 | Dal Santo | G08G 5/045 |
| | | | | 701/11 |
| 2012/0046802 | A1* | 2/2012 | Inou | B60W 30/10 |
| | | | | 701/1 |
| 2012/0130561 | A1 | 5/2012 | Chiang | |
| 2012/0143488 | A1* | 6/2012 | Othmezouri | B60T 7/22 |
| | | | | 701/301 |
| 2012/0288151 | A1 | 11/2012 | Kido | |
| 2013/0261949 | A1* | 10/2013 | Eriksson | G05D 1/104 |
| | | | | 701/300 |
| 2015/0235140 | A1* | 8/2015 | Rothermel | G06N 5/048 |
| | | | | 706/52 |

FOREIGN PATENT DOCUMENTS

| | | |
|---|---|---|
| DE | 10 2013 005 362 A1 | 10/2013 |
| EP | 2 562 060 A1 | 2/2013 |
| EP | 2 654 028 A1 | 10/2013 |
| EP | 2 693 416 A2 | 2/2014 |

OTHER PUBLICATIONS

Adrian Broadhurst et al., "Monte Carlo Road Safety Reasoning," Intelligent Vehicles Symposium, 2005, proceedings. IEEE, Jun. 6, 2005, pp. 319-324, XP010834142.

* cited by examiner

- Maxima approximately stationary in time and space

- Peaks are soft and broad for distant time and sharp and high for near time

- Peaks sharpen with time ➔ Annealing-Effect (nice for GD)

METHOD AND VEHICLE WITH AN ADVANCED DRIVER ASSISTANCE SYSTEM FOR RISK-BASED TRAFFIC SCENE ANALYSIS

BACKGROUND

1. Field

The invention relates to a method and a vehicle including an advanced driver assistance system.

2. Description of the Related Art

General-purpose traffic scene analysis is inherently difficult if more than a few traffic scene entities are involved, as it is e.g. the case at intersections, where several cars, pedestrians and scene structures like traffic lights, signals and lanes have to be considered in interaction for a proper scene interpretation. On the other side, traffic scene analysis always needs to be driven from the behavioral needs of the acting entity: What should the system investigate to be able to decide what to do next?

From its coupling to its own and other entities behavior, scene understanding always implies an evaluation of the possible dynamics or changes of state and its consequences in terms of behavioral risk and efficiency. In order to evaluate possible dynamic of other traffic participants it is necessary to have knowledge of possible future behavior of the other traffic participants. One approach is described in EP 2 562 060 A1 where from observable values such as position and velocity of other traffic participants a prediction of their future movement behavior is made. But no particular influence on the own behavior is made.

A relation between the trajectories that are predicted for the own vehicle (ego-vehicle) and another traffic participant is used to describe a risk for travelling further on on this trajectory is taken into consideration in DE 10 2011 106 176 A1 and DE 10 2012 005 272 A1. Both approaches use knowledge about the future trajectories of the ego-vehicle and the other traffic participant, but limit their analysis to a geometrical aspects. Thus it is ignored that trajectories of different vehicles might intersect or overlap but the vehicles will not be a the intersection point at the same time.

SUMMARY

To improve driver assistance systems it is thus desirable to improve the estimation of a risk for the future driving of a vehicle, depending on the development of a traffic scene.

The problem is solved by the invention according to annexed clams.

The proposed invention contributes to (i) the evaluation of traffic scenes by looking at the relation between the own and other entities' predicted dynamics, (ii) the estimation of risk factors associated with the dynamics, (iii) the evaluation of the dynamics and the associated risk factors for the benefit of an entities' own behavior and (iv) the planning of the own behavior based on all the previous points.

The benefits of this invention reside in the generality of the approach. The gained scene analysis scheme can be applied similarly on very different traffic scenes types like highway driving or intersection mitigation and scales favorably when increasing the number of involved entities, which are properties that the current approaches are lacking.

Target of the invention is to provide a method and vehicle with a system for scene analysis that evaluates the occurring in a traffic scene in terms of its dynamic risk and efficiency, that is computable with reasonable effort for scenes even with larger (>3) number of involved entities, and that applies without modification in a variety of traffic contexts. Entities in this context comprise other traffic participants such as vehicles or pedestrians but also infrastructural elements like traffic signs, barriers and so on. One important feature of the invention is the generation of a temporal risk map that explicitly represents zones of high risk for different temporal prediction horizons, since one axis of the map is the time or the travelled distance along an intended ego-trajectory (time and distance may be transformed into each other), as well as the planning and evaluation of future behavior alternatives within these risk maps, which provide an advantage because it allows the usage of standard optimization and planning algorithms with low computational costs.

Application targets of the invention are (i) corresponding warning assistance systems with a warning priority that depends on predicted risks and efficiencies associated to the different predicted dynamics of other traffic entities in relation to the own traffic participant.

In a second domain of semi-automated driving (ii), instead of a warning system an action of the own traffic participant can be suggested, supported or prepared. This is a natural outcome of the proposed method, since the risk and efficiency evaluation always occurs in relation to a set of own possible predicted trajectory alternatives, or, alternatively, a new trajectory with a favorable risk+efficiency measure can be calculated, and the own action can be selected to achieve one of these trajectories during behavior.

In the third domain of fully autonomous driving (iii), the selected predicted or calculated favorable trajectories associated with low risk and high efficiency can be used to guide control systems for executing autonomous driving actions.

All of these would provide the benefit that the scene analysis and the subsequent warning and assistance actions are evaluated using a concrete utility measure for the car's own behavior in terms of predicted risk and efficiency, instead of relying on implicit importance criteria like the proximity or velocity of e.g. a neighboring car.

For outputting a warning or for performing autonomous or semi-autonomous driving a control signal is generated on the basis of the analysis of the risk map. This signal either includes information about the risk on an intended travel path which can be used for driver warning or it includes information about an action that is to be taken by vehicle control systems like motor management or brake systems for autonomously accelerating or deceleration the vehicle.

The difference of the present invention over the prior art approach is shown in FIG. 1. On the left side a conventional approach is shown. The trajectories for the ego-vehicle and one other traffic participant are predicted and an intersection is identified. This intersection is associated with a high collision risk, ignoring that the vehicles may pass the intersection point at different times.

The right side of FIG. 1 shows one aspect of the present invention: Again the trajectories of the two vehicles in this simple traffic scene are predicted. But contrary to the conventional approach the risk is estimated for different points in time (corresponding to different positions of the ego-vehicle's trajectory) and the corresponding point of the trajectory of the other traffic participant. As it can be directly seen, there are three points on the ego-trajectory considered to show a significant risk, all lying on the trajectory before the intersection is reached. The highest risk is recognized for the center position out of the three.

Definitions

Risk: The term risk very close to the Wikipedia definition for technical processes as the mathematical estimation of the probability that some critical event (like an accident) will happen in the future, multiplied with the resulting cost or benefit if it does. Therefore probabilistically the risk calculation can be split into 2 terms, one that describes the cost or benefit (in the formula below denoted as "damage" for accidents) with the states and at the moment when the critical event occurs and one that describes the probability that the critical event occurs at a future time at t+s if a prediction starts with states at t:

$$P(\text{damage}_{t+s}|\text{states}_t):=P(\text{damage}_{t+s}|\text{states}_{t+s}, \text{first event}_{t+s})\,P(\text{first event}_{t+s}|\text{states}_t)$$

The damage term (first term after the = sign) can be formulated with state-of-the-art models, e.g. if there is an accident the probable severity of the accident can be calculated considering velocities, orientations, masses etc. at the time of impact.

The last term in the equation describes the future event probability, and this invention proposed several ways of dealing with it, using e.g. survival probability calculations, special risk indicating features (TCE (Time of Closest Encounter), TTCE (Time To Closest Encounter), PCE (Point of Closest Encounter), DCE (Distance to Closest Encounter), etc.), risk estimation for predicted trajectories and risk maps for a representation of risks for different future vehicle driving alternatives (see below for definitions of these terms).

The relation between the future event probability and the survival probability (see below) can be understood as follows: Starting at a point in time t a vehicle can only engage in a future event at a time t+s if it has not engaged in a critical event before during the interval [t,t+s[ (i.e., if it has "survived"), so that the future event probability is a multiplication of the survival probability for that interval multiplied by the event probability in the future at t+s, so that $$P(\text{first event}_{t+s}|\text{states}_t):=P(\text{first event}_{t+s}|\text{states}_{t+s})\,P(\text{no event before}_{t+s}, \text{states}_{t+s}|\text{states}_t)$$

and this is just the formulation of the approach that can be used below to calculate the future event probability with (see below at the definition of "survival probability").

$$P_E(s;t,\delta t) = \{\tau^{-1}[\text{states}(t+s)]\delta t\} S(s;t)$$

The formulas for the risk together with the formulas for the survival probability below allow to build the risk maps needed for future risk estimation and future low-risk behavior generation.

Situation: A prototypical combination of interacting scene elements (vehicles, other objects, structures) and their dynamics (maneuver options, state changes) within some time period. Of particular importance are situations that describe different discrete behavior/maneuver alternatives of the interacting elements. For example, a scene with similar evidence (scene elements, dynamics) like a crossing situation with two not-yet-moving cars front-to-front can give rise to different situations like both continuing straight, one turning, both turning, etc.).

Situation hypothesis: A representation of a situation that is used as a system prototype for representation and classification purposes. If in a scene, the required scene elements and dynamics that specify a situation are present, we say that it is consistent with that situation. Situation classification is important for a segregation of scenes into situation classes, where the inter-class variability of the states and the dynamics should be reduced as compared to the intra-class variability. Situation analysis with the purpose of classification can be achieved by state-of-the-art means, using standard classification and machine learning methods, such as e.g. Neural Networks, Support Vector Machines, Bayesian Belief Nets, etc.

Trajectory: A set of state vectors (a list of values that quantify selected states of scene elements) over discrete or continuous points in time. In particular, if we analyze moving objects, the main states are the kinematic states (position, velocity, acceleration, orientation, etc.) and the trajectory can be represented as a line that is created as the object moves in space.

Predicted trajectory: Extrapolation of the state vectors from the current and/or the past state(s). This can be achieved by several state-of-the-art methods like prediction models (e.g., a car with a certain velocity and turning rate in a curve is assumed to continue at that velocity and turning rate), comparison with prototypical trajectory segments, time-series analysis, etc. Important for predicted trajectories is also the infrastructure: We usually will use simple prediction models like "car will probably continue driving along its lane" if we know where the lane is.

Comparison of trajectories: Done in this invention by starting at a common point in time for e.g. two trajectories, and comparing the state vectors as time advances. For each point in time, the states of the two trajectories are used to calculate a momentary risk indicator, which quantifies the risk probability for that exact moment in time and those particular states. For example, if at a certain time the spatial extension of the involved elements is such that they touch each other (distance 0), we say that the collision probability is 1. The collision risk can then be calculated using further states at that moment in time, like the angles with which they collided and the velocities and masses involved.

Survival probability: One main component of the present invention is to calculate the risk of events at different times ahead in the future, leading to a risk function for a limited period of prediction time. The future risk can be calculated by using a so-called "survival function", which considers the effect that events lying more ahead in the future get less probable. A survival function indicates how probable it is that e.g. a traffic participant "survives" for a certain period of time without being engaged in a high risk event during that time period while its state and the state of others develop according to predicted trajectories. As a mathematical formalism, we give an example of a survival function. Consider a particular moment in time from the involved scene elements trajectories. The probability that the ego-car gets involved in a high risk event can be quantified by an instantaneous event rate $$\tau^{-1}(\text{states})$$

which is the reciprocal value over the mean time between events and which depends on the states at that moment (current or predicted). The event probability at time t for an arbitrarily small time interval then depends on the states at that time and is $$P_e(t,\delta t) = \tau^{-1}[\text{states}(t)]\delta t.$$

If we look at a statistical ensemble of equivalent ego-cars, we may ask: How many of these cars can drive along without being engaged into an accident during a certain period of predicted time? Starting at an arbitrary time t and slicing the prediction time period into small intervals a certain proportion of the cars engages in an accident in the first small interval, while the remaining proportion "survives". From the surviving ones, some are engaged into an accident in the second small interval, and so on. A formulation of this in mathematical terms leads to a function that decreases from 1 to 0 from the starting time t to the future time t+s and that expresses, depending on the time-course of states of the scene elements involved in the traffic situation from t to t+s, the survival probability:

$$S(s;t)=\exp\{-\int_0^s \tau^{-1}[\text{states}(t+s')]ds'\}$$

Knowing the survival probability, we can then calculate the probability of future events by combining it with the instantaneous future event rate.

$$P_E(s;t,\delta t)=\{\tau^{-1}[\text{states}(t+s)]\delta t\}S(s;t)$$

Several causes for risks can be incorporated by adding several instantaneous event rates, and the survival function and the overall probability of future events can then be calculated in an analogous way, allowing an easy consideration of multiple risks and an easy calculation of future risk probability.

Time-of-Closest-Encounter (TCE), Time-To-Closest-Encounter (TTCE), Position-of-Closest-Encounter (PCE), Distance-of-Closest-Encounter (DCE): Features or indicators which are estimated by comparing the trajectories of scene elements, and that are relevant for the calculation of the future risks and the risk maps. The TCE between two trajectories is the absolute point in time where two trajectories come closest to each other, and the PCE is the point of the ego-car trajectory where this occurs. In FIG. 4, this can be seen in the upper left figure for two exemplary trajectories (e.g. ego-trajectory green, other trajectory red). The DCE is the distance between the two scene elements at that moment in time, and the TTCE is the (relative) timespan from an arbitrary time t (e.g. now) until TCE (for DCE and TTCE see upper middle drawing in FIG. 4). These features are shortcut estimations for building risk maps, since they indicate when and where maxima of future risks occur and how they are shaped.

BRIEF DESCRIPTION OF THE DRAWINGS

The invention can easily be understood taking into consideration the annexed drawings.

DETAILED DESCRIPTION

Figure 1:
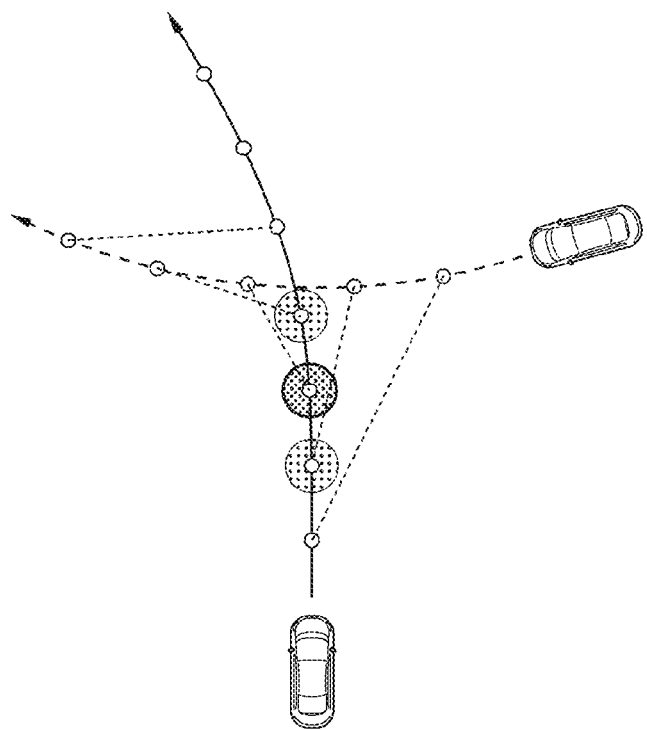
FIG. 1 shows a difference between a prior art approach (left part) and the principle of the invention.
Figure 1:
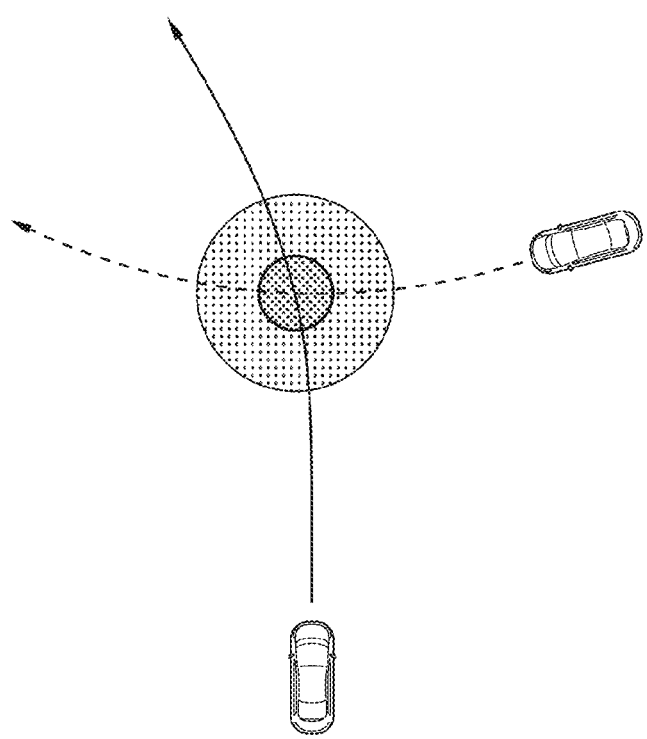

The proposed methods basically comprises the steps of
1) a state resp. trajectory extrapolation or prediction of the ego vehicle and at least on arbitrary traffic participants leading to a sequence of states for each. Instead or in addition to the trajectory prediction for the other traffic participant a state sequence describing the states of an infrastructure element such as a traffic light can be used.
2) a calculation of a risk function for any pair of state sequences for the traffic participants, resulting in a function of risk over time or alternatively over trajectory path length of one of the traffic participants for that sequence pair. In the following it is assume that all the steps are carried out from the point of view of an ego-vehicle. In that case the risk over trajectory path obviously relates to the ego-vehicle trajectory path.
3) a generation of a selected set of state sequences, in particular for one traffic participant (e.g. the "ego"-car) e.g. by starting at variations from the current state of the chosen traffic participant,
4) a calculation of risk functions for the set of state sequences of the chosen traffic participant,
5) a combination of the risk functions into an at least 2-dimensional risk map which indicates the risk over time or alternatively over ego-car trajectory path length and over the different selected state sequences (in this risk map, each point is a risk at a certain ego-car trajectory point for certain ego-car predicted trajectory parameters),
6) analyzing the risk map by calculating different possible paths or parts of paths through the risk map from the current state to at least one target state or target state region which serve as a guideline for a desired behavior,
7) a selection of an overall favorable path to reach from the current state to the vicinity of a target state or target state region, with favorable paths or parts of paths being characterized by a good tradeoff/combination of the risk along the path and an efficiency criterion which may be defined in a variety of ways, including time constraints, velocity, acceleration or smoothness constraints, driver comfort and/or energy efficiency, or notifying a driver of risks on his intended path, by use of a control signal
8) the use of the selected favorable path as a driving or control model and
9) sending signals to influence the driving state of a real car (the ego-car), or, alternatively, warn the driver about interesting situations making use of the selected favorable path.

At the core of the invention are two notions:
1) Continuous risk indicators. We start by formulating that any situation has an inherent risk, especially when extrapolated into some future, even if the current state combination of e.g. an ego-car and another car does not lead to a collision. Continuous risk indicators depend on the classical parameters that are associated with physical risk, e.g. distance between cars, the current relative heading angles, the masses and velocities (as e.g. needed for an impact calculation), but also single car indicators like centrifugal acceleration at a certain curve point for a certain velocity, etc.). The underlying assumption is that by the continuous risk measures we capture the inherent uncertainty in e.g. the sensor measurements, the state estimation of others, the behavior variability, etc.
2) Dynamic risk maps. We assume that we can calculate and represent the actuation alternatives of the ego car in a so called risk map, which has a spatial component, but which is basically a high-dimensional function of the risk over the potential behavior alternatives of the ego-car and the driven time or space along the ego-car trajectory. The risk maps indicate, how risky will a certain behavior alternative be in the future.

Planning and evaluation of future behavior meaning a future movement behavior of the ego-vehicle is then performed using the risk maps. Since the risk maps represent future risk over time and ego-car behavior, they can be directly used for behavior estimation. A path (a line connecting a set of points) through the risk map can be directly associated with a risk and indirectly (by including conditions that the state-sequence along the path should fulfill) with other cost and benefit factors. This is an advantage over the state-of-the-art methods. If we have a path (e.g. recorded, predicted or planned), we can overlay it with the risk map and see if and when it encounters high-risk zones and output a control signal for outputting a driver warning of the encountered risk on such path exceeds a predetermined threshold. If we are searching a path, we can use the risk map as a topology where we conduct the search. Finding a way through such risk map thereby avoiding risk maxima can be performed by known methods such as RRT or the like once the risk map is established.

Figure 2:
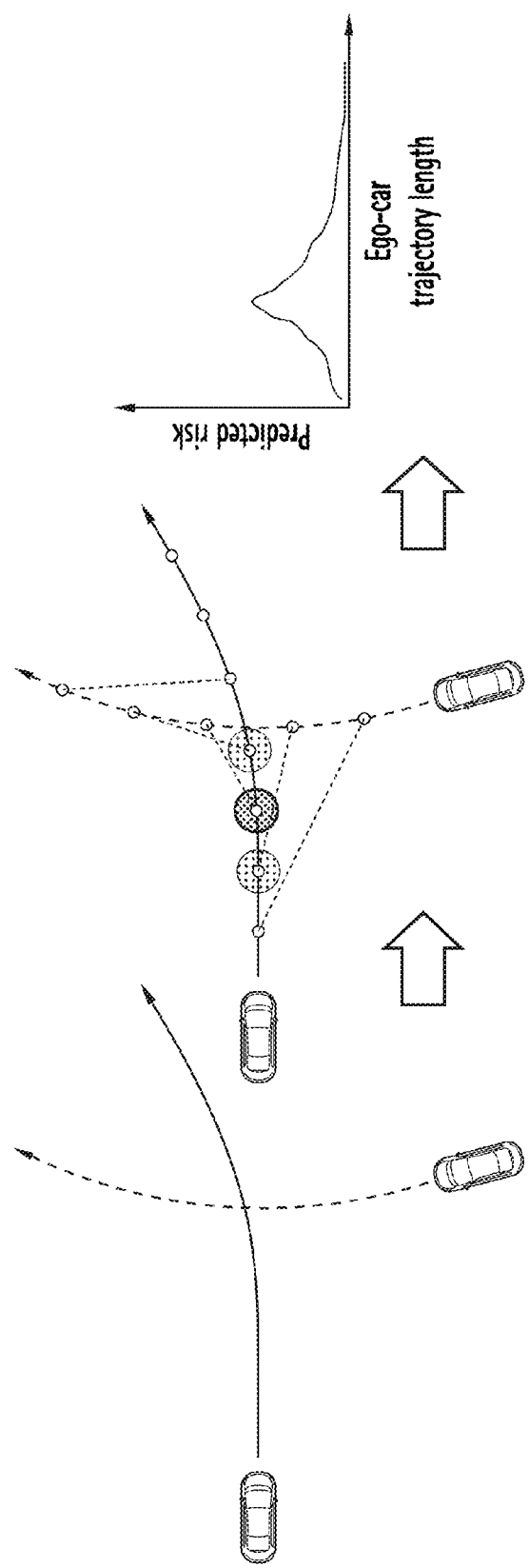
FIG. 2 illustrates the invention in more detail.

In FIG. 2 the ego-vehicle is indicated by the trajectory with the solid line. To calculate the risk maps, e.g. for the risk inherent in the interaction of two cars in a traffic situation shown in FIG. 2, we start at a defined time t (usually the current time), predict the future trajectories of the two cars (ego-car and other car) and calculate, for each point in time, the continuous risk indicators. For example the risk is considered to be the higher, the closer the vehicles are at a point in time. The middle part of the FIG. 2 shows the corresponding positions on the trajectories of the two vehicles and indicates the resulting risk at the positions of the ego-trajectory. This gives a curve of future risk over time resp. ego-car trajectory length as indicated in the rightmost part of FIG. 2.

We repeat this for a plurality of potential future ego-car trajectories, which represent the ego-car behavior alternatives. These alternative trajectories may be obtained by varying the ego-trajectory it was started with. Such initial ego-trajectory may be the most like trajectory as an outcome of a prediction of future movement behavior. The other traffic participant is also represented by at least one predicted trajectory (there may also be several predicted trajectories to capture a certain variability in the others' behavior, the one shown in the Figs. may be the one which is most likely again). For each pair of predicted trajectories (one from the ego car and one from the other traffic participant), we get a function of risk over future time or, (which can be calculated equivalently by scaling the time axis), of risk over driven ego-car trajectory length. If the other traffic participant is represented by several trajectories the risk functions of these trajectories are averaged.

Figure 3:
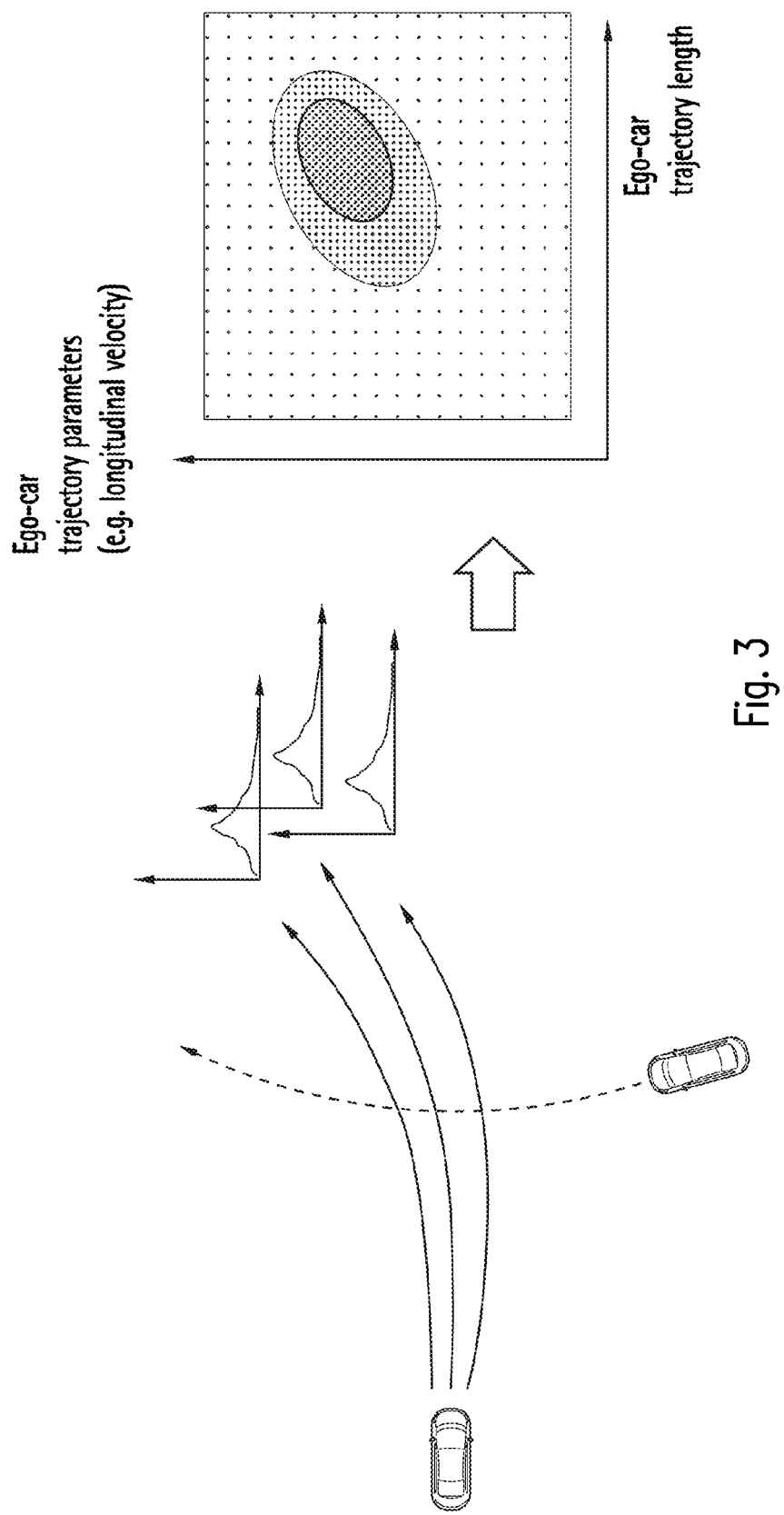
FIG. 3 shows the effect of varying the EGO-vehicle behavior.
Figure 4:
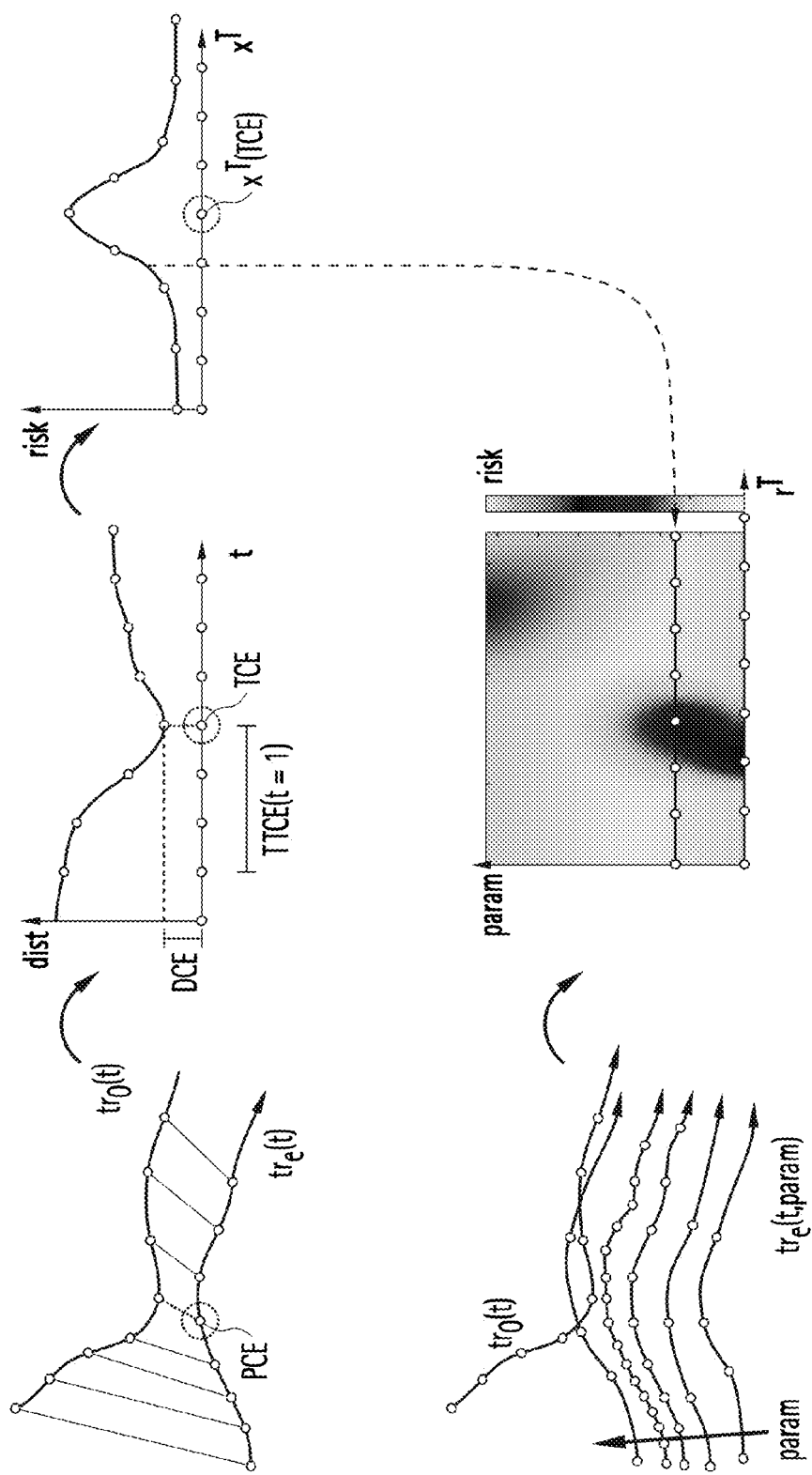
FIG. 4 illustrates the generation of a spatio-temporal risk map.

We then assemble the plurality of risk functions of the different ego-trajectory alternatives to get a risk map, which is an at least 2-dimensional map/function over driven ego-car trajectory length and parameters of the ego-car future trajectories. A typical usage is a risk map with longitudinal velocity as the main parameter of the ego-car future trajectories. See FIG. 3 for a graphical explanation.

For the calculation of the values in the risk map, we use a continuous risk function based on risk indicators, which calculate the risk from the states of the ego-vehicle and the other traffic participant for one moment in time. The risk e.g. depends on the distance and the velocities of the involved traffic participants at one point in time, but can be extended to include e.g. heading angles, masses, etc. The risk map will then exhibit pronounced maxima at certain points of ego-car driven trajectory length and behavior parameters. A favorable behavior would then be one that avoids these maxima. It is to be noted that instead of the other vehicle also an infrastructure element could be used.

In addition to the risk calculation for each timestep, in one particular embodiment we discount for the assumption that predictions lying more ahead in the future are less certain. This has the effect that maxima in the risk map lying in the more distant future are lower or broader than maxima in the near future and they will sharpen (they will get narrower) and increase as they get closer in time. In a particular embodiment of the invention, this time effect is incorporated by calculating a "survival probability function", which indicates how probable it is that a car moving along a predicted trajectory will survive up to a point in the future without getting involved into a risky event like a collision.

Figure 5:
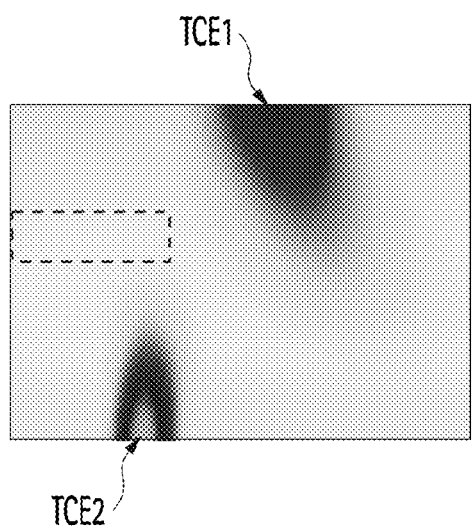
FIG. 5 explanation on elements for generation of a risk map.

In another embodiment of the invention, the effect of time for the risk is incorporated into the risk maps by calculating collision-relevant aspects of trajectories like e.g. TCE (time of closest encounter), TTCE (time to closest encounter), PCE (point of closest encounter) and DCE (distance of closest encounter), which are all parameters of those points where two trajectories come closest, and adjusting the width and height of the maxima in the risk map according to these parameters as explained before, such that the maxima of the risk peaks will be located around the TCE and PCE, with their heights determined by the DCE and their width determined by TTCE. FIG. 5 explains this.

Figure 7:
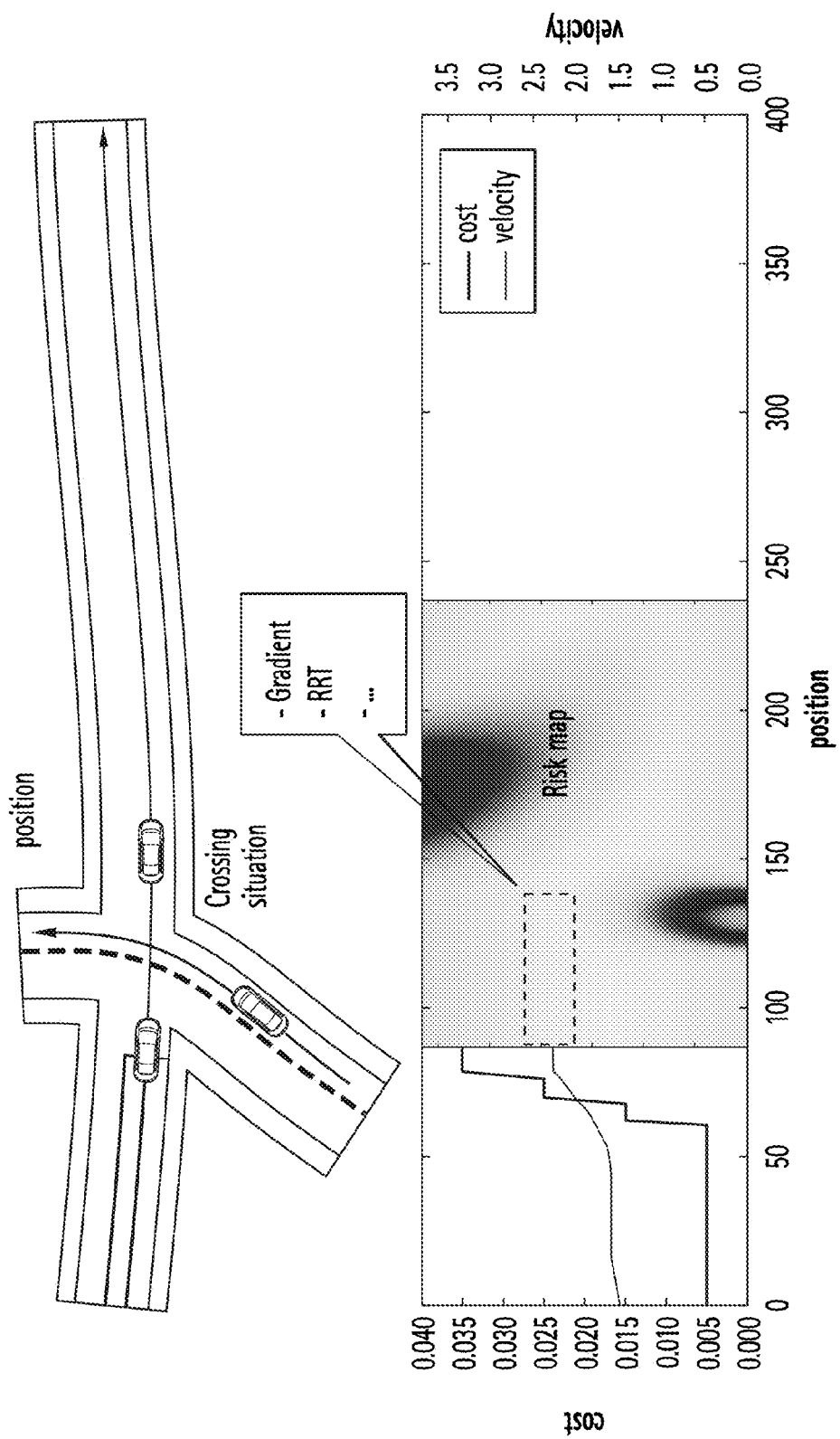
FIG. 7 example for a risk map for two cars at a crossing.

For example, we take an (overly simplified) situation of the ego-car entering a crossing approaching a car driving on the same road and in the same direction but slower, and with another car passing the crossing. The situation is shown in FIG. 7. The variation of the ego-car trajectory parameters may e.g. occur by a variation of the ego-car velocity. For high velocities, the ego-car might be able to pass before the other car comes, with relatively low risk. But then the ego-car will relatively fast approach the preceding car which causes another risk. For medium ego-car velocities, it might collide with or get very close to the other car somewhere in the intersection, and for very low ego-car velocities, the other car passes first and the ego-car can afterwards enter the crossing without danger. The risk map is then a 2D map of the risk plotted over the longitudinal ego-car trajectory length when entering the intersection and the ego-car velocity of its assumed trajectory. Somewhere at medium velocities, there will be a risk maximum, which the ego-car should try to avoid. See also FIG. 7 for such a situation and the corresponding risk map.

The shown risk map shows the two maxima that result from comparing the multiple ego-trajectories with the predicted trajectory of the preceding vehicle and with the vehicle crossing the ego street at the intersection. Since the first event will be the crossing of the vehicle this risk is much sharper in the risk map than the event related to the preceding car.

But risk maps can also be calculated for other types of risk, either involving static structures in the environment or no structures at all. In this case the risk calculation (risk function) has to be adjusted accordingly, e.g. in the case of static structures, for each predicted trajectory of the ego-car, for each point in this trajectory the shortest distance to the static structure can be calculated and the risk is then a function of this distance (shorter distance meaning higher risk). Similarly, the risk of being too fast in a curve can be calculated as a function of the centrifugal acceleration at each point of the ego-car predicted trajectory. Also static but state-changing elements like traffic lights can be incorporated by similar means. The setup of such state-dependent risk functions is uses analogous considerations as presented above for the at least two vehicles. Instead of a trajectory that is predicted for the other traffic participant a state sequence is used then, describing the changes in state over time.

In a risk map, several risk factors (e.g. risk functions for several other traffic participants) can be superposed, so that we can plan behavior considering several risk sources at once. This is shown in the risk map of FIG. 7, which incorporates two cars in addition to the ego car, and where the risk map also exhibits two maxima, corresponding to the two cars. It makes less sense, though, to include too many different behavioral alternatives of other traffic participants (e.g. go straight, turn left or turn right, all with their respective velocity variations, etc.) into one map, since then such a system would foresee risk everywhere.

Once the risk maps have been established, they can be used to search for risk-aversive paths. The idea is to find a way through the risk map that minimizes risk (e.g. maximum risk along the path) and maximizes efficiency or minimizes cost (e.g. in terms of time to a target, or smoothness and physical plausibility of the way through the risk map). The efficiency/cost criteria have to be added because otherwise the ego-car would stay at the low risk points of the map. The efficiency can for example be taken into consideration by preferring a path that allows to stay closer to a desired travel speed which is set for example be a cruise control system. For paths that require a greater deviation from the desired speed the benefit will be decreased. The final analysis of the risk map thus finds a compromise between the accepted risk and the efficiency. This avoids that the methods locks the ego vehicle in a minimum of the risk map with speed 0.

For the search of risk aversive paths, different state-of-the-art algorithms can be used, like gradient descent or search or planning algorithms like RRT, RRT*, etc (gradient-descent-based evaluations require slanted version of the risk maps, with the slant quantifying the efficiency criteria). The goal of the search for risk-aversive paths is to have a way through the map from a source zone (e.g. corresponding to the current state and time of the ego-car) to a desired target zone (where the ego-car wants to get).

Figure 6:
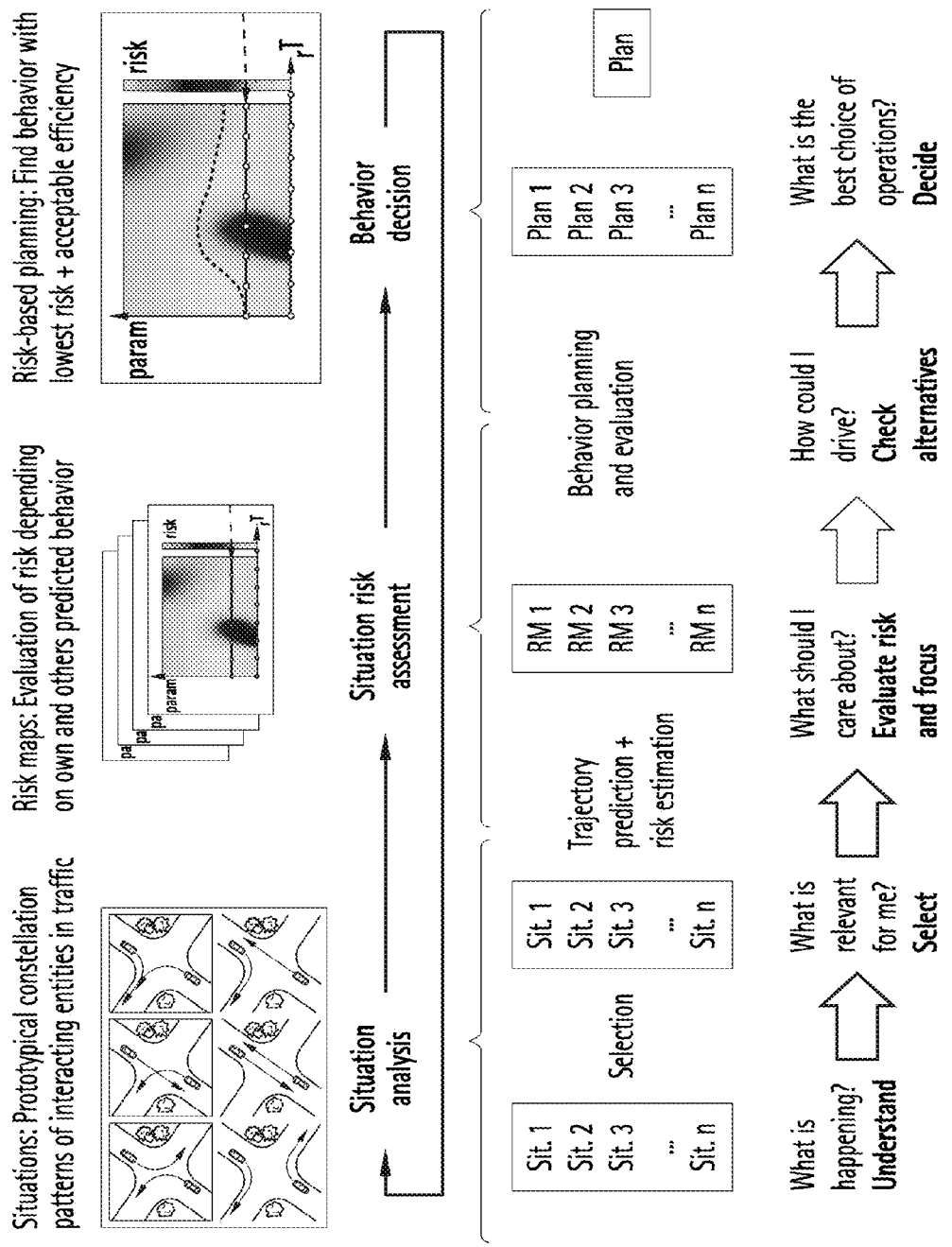
FIG. 6 illustration of alternatives in a traffic scene and their influence.

In an extension, it is sometimes useful to work with several risk maps in parallel and to do a search of risk-aversive paths by combining the findings and constraints from several risk maps. A typical embodiment of such a system is shown in FIG. 6. In this case, the system has to be complemented by a situation classification step, and followed at the end by a path combination step using several risk maps.

Especially if there are several alternative interpretations of a traffic scene which lead to different involved predicted risks, this becomes necessary. We then at first search which situation classes apply to a scene (in FIG. 6 upper left, one traffic scene is shown which is compatible with several different "prototypical" situation classes, with different risks), and select a subset of the possible candidates according to some criteria (like a mixture between evidence for the class and past experienced risk for the involved class). Typically, the situations represent discrete behavioral choices of other traffic participants. For each chosen situation candidate, we build a separate risk map. In a subset of all of these risk maps, we can then search for risk-aversive paths. For a decision, we then have to find a good compromise from the path proposals of the risk maps, or choose the most favorable one. The chosen path will then again be the basis for actuation support, control, or situation and risk dependent warning.

Since evidence for situation as well as the assumptions that were valid for the ego-car and the other traffic entities state predictions changes over time, a calculated risk-aversive path has only a limited validity time-horizon. When situation evidence, or other scene parameters change, we have to revalidate any of the steps of situation classification, selection, risk, map calculation, planning and behavior decision. One common way is to calculate at each step a time-horizon during which the operations are considered to be safe, and to update the system as soon as this time-horizon is reached or something anomalous happens.

Possible applications are driver assistant systems where several traffic participants are involved and where a dynamical prediction provides benefits in terms of risk avoidance and efficiency maximization. Particular application scenarios would be inner city assistance or autonomous functions at crossings, where purely spatial analysis of the trajectories provides many risky areas and where it is not only important if a driver will cross the other cars trajectories at all, but when and in which sequence.

After the evaluation or analysis of the risk map a control signal is output. This control signal either includes an information about risks on the intended travel path (corresponding to the predicted trajectory) exceeding a threshold for the risk measure and is suitable to generate a warning which is presented to a vehicle driver. In case of semi-automated driving or autonomous driving the control signal is suitable to directly influence the control systems of the ego-vehicle. Thereby the driving state of the vehicle is controlled in such a way that the selected preferred path through the risk map is followed.

As the situation may of course develop differently from the original prediction, the method regularly reconsiders the predicted trajectories or state sequences. This can be done on a predetermined time interval basis or in the event that a significant change in the assumptions can be recognized.

The invention claimed is:

1. Method for the support of driving an ego-vehicle including the following steps:
   selecting at least one traffic participant and/or infrastructure element involved in a traffic situation,
   calculating of a hypothetical future trajectory from the ego-vehicle and varying this hypothetical future ego-trajectory to generate a plurality of ego-trajectory alternatives including the calculated hypothetical future ego-trajectory,
   calculating of at least one hypothetical future trajectory from said at least one traffic participant and/or calculating of a hypothetical future state sequence of the infrastructure element,
   calculating a plurality of a risk functions over future time or along the calculated hypothetical future ego-trajectory alternatives, wherein one risk function corresponds to one ego-trajectory alternative, wherein each risk function is calculated by estimating, over future time, a critical event risk for each of common points in time of said one ego-trajectory alternative and said at least one hypothetical future trajectory or by estimating, along the respective calculated hypothetical future ego-trajectory alternative, a critical event risk for each of corresponding positions of said one ego-trajectory alternative and said at least one hypothetical future trajectory,
   combining the plurality of risk functions into a risk map, and
   analyzing the risk map and generating a control signal for assisting the driving of the ego-vehicle.

2. Method according to claim 1, wherein a plurality of risk maps is generated.

3. Method according to claim 1, wherein the risk maps are calculated on the basis of a survival probability function which takes into account the effect that events lying more ahead in the future get less probable.

4. Method according to claim 1, where contributions to the risk maps are calculated with indicators like Time-of-Closest-Encounter (TCE), Time-To-Closest-Encounter (TTCE), Position-of-Closest-Encounter (PCE), Distance-of-Closest-Encounter (DCE) and physical states at the TCE+PCE.

5. Method according to claim 1, wherein the analysis of the risk map includes evaluating time and state of the maximal risks and, depending on thresholds on risk value, time and states at the points of maximal risk.

6. Method according to claim 1, wherein a trajectory for the ego-vehicle is planned, based on the trajectory risk and efficiency, selection of one of the ego-vehicle trajectories from the risk map as a favorable path that serves as control target for behavior, with the risk of a trajectory calculated from the risk map values and the efficiency calculated from additional criteria like including at least one of path length, travel time, continuity, proximity to desired velocities.

7. Method according to claim 1, wherein subpaths which are parts of a path through the risk map from a starting zone of the risk map to a target zone corresponding to a starting state (start zone) to a desired target state (target zone) of the ego-vehicle are searched, and these parts are used as a control target for behavior.

8. Method according to claim 7, wherein a favorable path through the risk map is estimated by a comparison, selection and/or combination of subpaths according to path-dependent risk and efficiency criteria, where the risk of a path is calculated from the risk map values along the path and the efficiency is calculated from additional considerations including at least one of path length/travel time, continuity, proximity to desired velocities, and using the favorable path as a control target for behavior.

9. Method according to claim 6, wherein at least one of the ego-trajectories is projected onto the risk map and compared to the estimated favorable paths or subpaths, with the control signal being used to output a driver warned about the risks in its current and its predicted path if there is a deviation above a given threshold.

10. Method according to claim 6, wherein favorable paths or subpaths are calculated wherein an overall favorable path is gained from the evaluation and combination of paths and subpaths from several risk maps.

11. Method according to claim 1, wherein the risk map is recalculated repetitively to adjust the risk map to changes in the environment and in the states of other traffic participants.

12. Method according to claim 1, wherein a validity period of a future time horizon is calculated, during which the risk map or the result of the analysis of the risk map is considered to remain valid, and wherein the risk maps and the analysis as well as the validity period are recalculated when the end of the validity period is reached.

13. Method according to claim 1, wherein the risk maps are calculated only at selected points of the map required for one execution substep of the search and planning algorithms.

14. Method according to claim 1, said method further comprising:
analyzing a scene for classifying a traffic situation into a set of possible situation hypotheses,
specifying a situation hypothesis by a prototypical combination of traffic participants and/or infrastructure elements of the scene and their dynamics including at least one of maneuver options and state changes that can be identified,
selecting of candidate situations from the situation hypotheses,
calculating of a risk map each situation hypothesis, and
evaluating of the predicted risk from the at least one risk map to support the vehicle driving control.

15. Method according to claim 13, wherein the selection of candidate situations occurs by the calculation of a confidence value for each of the situation hypotheses from the classifier, the confidence being a measure of the "degree of fit" of the situation to the evidence extractable from the traffic scene, the calculation of an expected risk associated with each of the situation hypotheses, and the selection of candidate situations is based on an appropriate combination of confidence and expected risk.

16. Vehicle comprising an advanced driver assistance system configured to carry out the method according to claim 1.

* * * * *